(12) United States Patent
Liu

(10) Patent No.: US 8,542,496 B2
(45) Date of Patent: Sep. 24, 2013

(54) MOUNTING DEVICE FOR EXPANSION CARD

(75) Inventor: Lei Liu, Shenzhen (CN)

(73) Assignees: Hong Fu Jin Precision Industry (ShenZhen) Co., Ltd., Shenzhen (CN); Hon Hai Precision Industry Co. Ltd., New Taipei (TW)

(*) Notice: Subject to any disclaimer, the term of this patent is extended or adjusted under 35 U.S.C. 154(b) by 129 days.

(21) Appl. No.: 13/311,568

(22) Filed: Dec. 6, 2011

(65) Prior Publication Data
US 2013/0135826 A1    May 30, 2013

(30) Foreign Application Priority Data
Nov. 28, 2011  (CN) .......................... 2011 1 0383649

(51) Int. Cl.
*H05K 7/14* (2006.01)
(52) U.S. Cl.
USPC .......................... 361/759; 361/752; 361/753
(58) Field of Classification Search
USPC ............ 361/807, 809, 810, 679.01, 679.02, 361/679.31, 679.32, 737, 756, 759, 739, 361/740, 741, 784, 785; 439/67, 70, 71
See application file for complete search history.

(56) References Cited

U.S. PATENT DOCUMENTS

| | | | |
|---|---|---|---|
| 7,746,664 B2 * | 6/2010 | Zhang et al. | 361/801 |
| 7,848,102 B2 * | 12/2010 | Fan et al. | 361/679.58 |
| 2006/0198115 A1 * | 9/2006 | Chen et al. | 361/796 |
| 2011/0096500 A1 * | 4/2011 | Zhang et al. | 361/695 |
| 2012/0020037 A1 * | 1/2012 | Chiu et al. | 361/759 |

* cited by examiner

*Primary Examiner* — Hoa C Nguyen
*Assistant Examiner* — Ahmad D Barnes
(74) *Attorney, Agent, or Firm* — Altis Law Group, Inc.

(57) ABSTRACT

A mounting device for mounting an expansion card which forms a fixing piece at an end includes a rack and a frame detachably mounted to the rack. The rack defines two spaced recessed portions. Each recessed portion includes two opposite sidewalls and a bottom wall connected between the sidewalls. A resilient member is formed on each of the bottom walls. Two parallel tabs and a connection portion connected between the tabs are formed on the frame. The tabs are respectively received in the recessed portions and each abuts against one of the sidewalls of the corresponding recessed portion. The fixing piece of the expansion card is sandwiched between one of the tabs and the corresponding resilient member.

7 Claims, 5 Drawing Sheets

MOUNTING DEVICE FOR EXPANSION CARD

BACKGROUND

1. Technical Field

The present disclosure relates to a device for mounting an expansion card.

2. Description of Related Art

Typically, fixing devices used for fixing expansion cards in computers only can fix expansion cards of a particular size, which is less desirable in cases that require a variety of expansion cards to be fixed.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
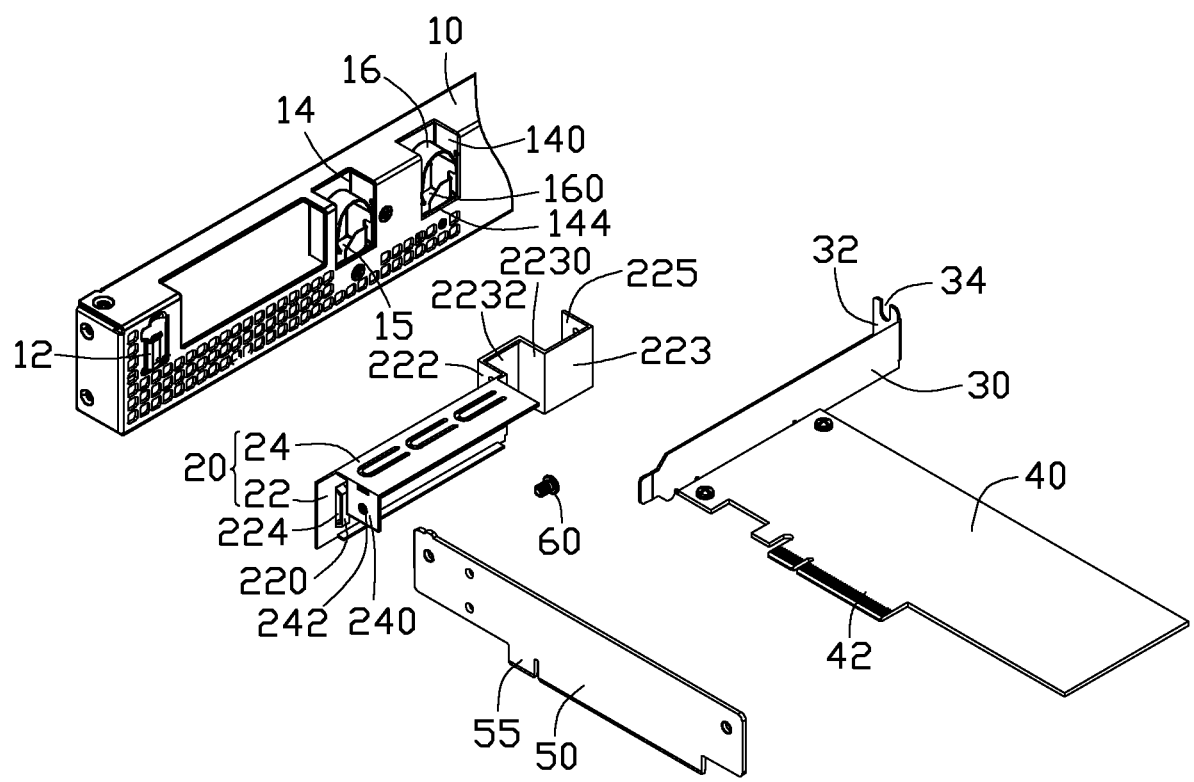
FIG. 1 is an exploded, isometric view of an exemplary embodiment of a mounting device together with a first expansion card.
Figure 2:
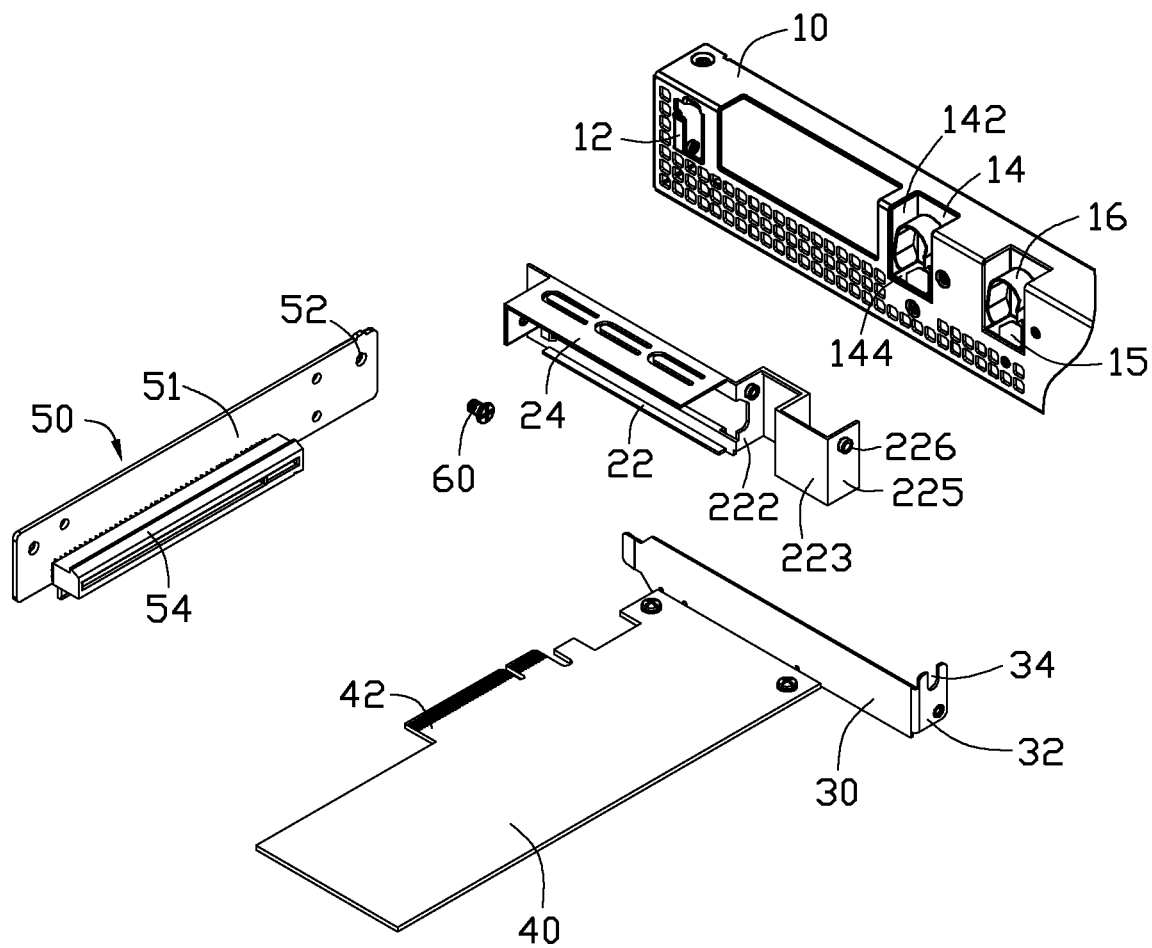
FIG. 2 is similar to FIG. 1, but viewed from another perspective.
Figure 5:
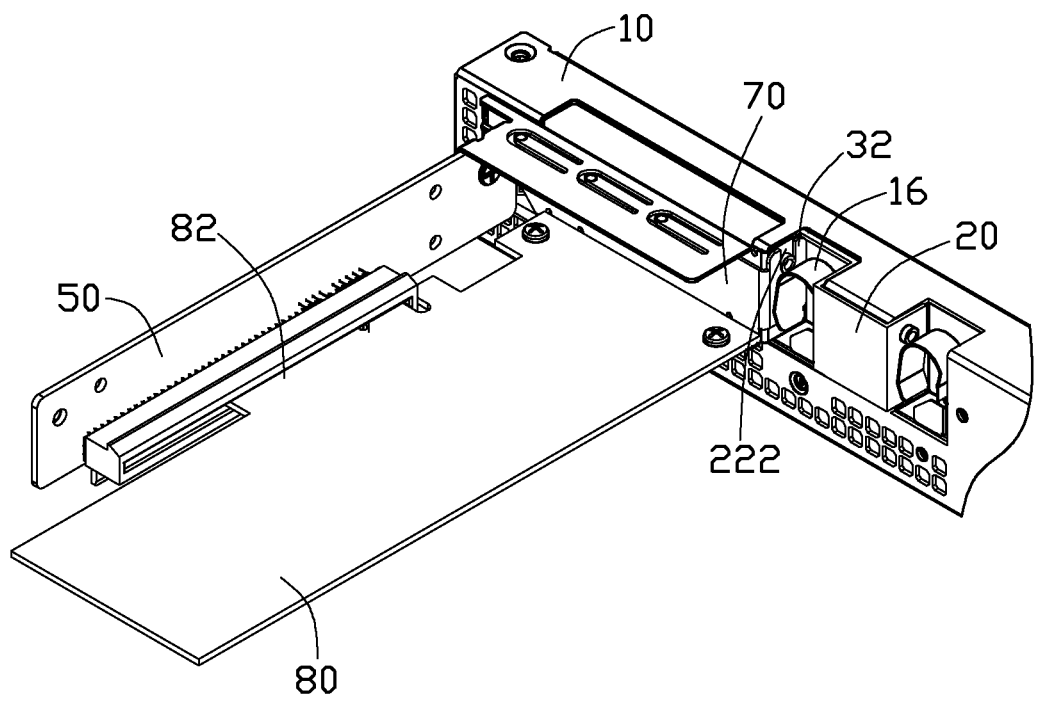
FIG. 5 is an assembled, isometric view of the mounting device of FIG. 2 and a second expansion card.

Referring to FIGS. 1, 2, and 5, an exemplary embodiment of a mounting device is provided for mounting either a first expansion card 40 or a second expansion card 80. The first expansion card 40 has a larger width than the second expansion card 80. The mounting device includes a rack 10, a frame 20, and a switch member 50.

A fixing member 30 is fixed to an end of the first expansion card 40. The first expansion card 40 includes an edge connector 42 at a side.

A fixing member 70 is fixed to an end of the second expansion card 80. The second expansion card 80 includes an edge connector 82 at a side.

The fixing members 30 and 70 have a same form, but the fixing member 30 has a greater length than the fixing member 70. A fixing piece 32 perpendicularly extends back from a first end of each of the fixing members 30 and 70. A cutout 34 is defined in each fixing piece 32 and extends through a top of the fixing piece 32.

The rack 10 forms a substantially L-shaped blocking portion 12 at a first end toward a second end opposite to the first end. Two recessed portions 14 are defined in a front surface of the rack 10, adjacent to the second end of the rack 10 and extending through a top of the rack 10. A distance between the blocking portion 12 and a first one of the recessed portions 14 is larger than a distance between the blocking portion and a second one of the recessed portions 14. Each recessed portion 14 includes two opposite sidewalls 140 and 142, and a bottom wall 144 connected between bottoms of the sidewalls 140 and 142. An abutting member 15 is fixed to a bottom wall 144 of each recessed portion 14. A substantially C-shaped resilient portion 16 extending from an end of the abutting member 15 adjacent to the sidewall 140 toward the sidewall 142. An opening 160 of the resilient portion 16 faces the bottom wall 144. A distal end of the resilient portion 16 is resiliently abutted against the sidewall 142.

The frame 20 includes a first plate 22 and a second plate 24 perpendicularly extending from a top side of the first plate 22. A bridge-shaped holding piece 220 perpendicular to the second plate 24 is formed on a first end of the first plate 22. An engaging hole 224 is defined between the first plate 22 and the holding piece 220. A first tab 222 extends backward from a second end of the first plate 22 opposite to the first end. A substantially Z-shaped connection portion 223 extends from a rear side of the first tab 222. A second tab 225 extends backward from a distal end of the connection portion 223 opposite to the first tab 222. The second tab 225 is parallel to the first tab 222. The connection portion 223 includes a third tab 2230 parallel to and between the first and second tabs 222 and 225, and two extension tabs 2232 perpendicularly extending from opposite ends of the third tab 2230 away from each other to connect to the corresponding first and second tabs 222 and 225. A protrusion 226 protrudes from a side of each of the first and second tabs 222 and 225 away from the holding piece 220. A fixing tab 240 defining a through hole 242 perpendicularly extends down from an end of the second fixing member 24 adjacent to the holding piece 220.

The switch member 50 includes a circuit board 51 defining a through hole 52 in an end, an expansion slot 54 mounted to a side surface of the circuit board 51, and an edge connector 55 formed on a bottom side of the circuit board 51.

Figure 3:
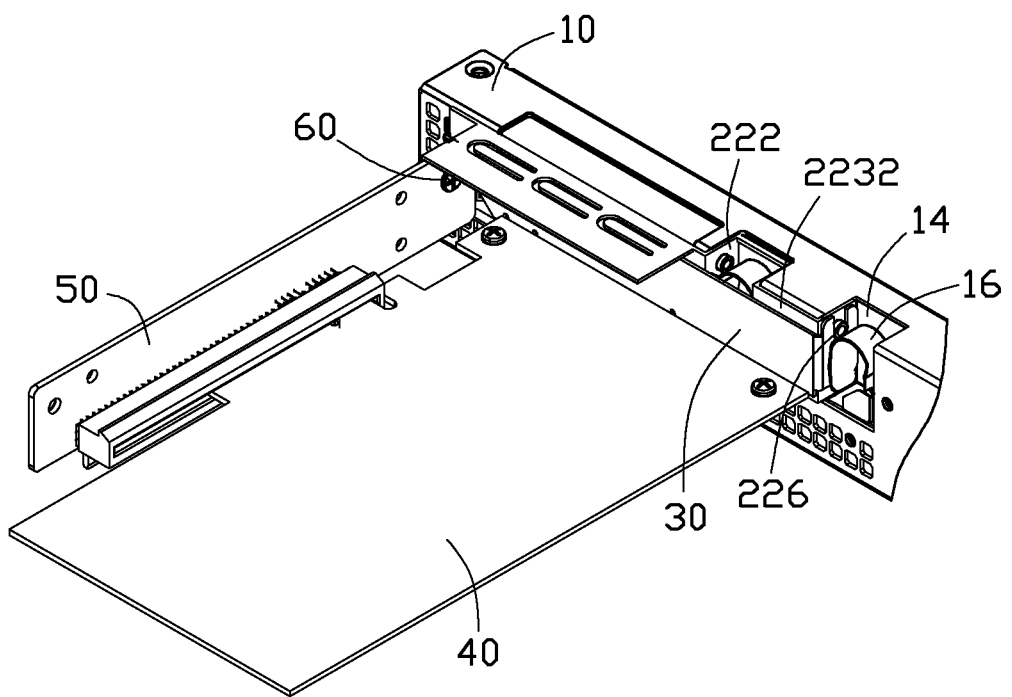
FIG. 3 is an assembled, isometric view of the mounting device and the first expansion card of FIG. 2.
Figure 4:
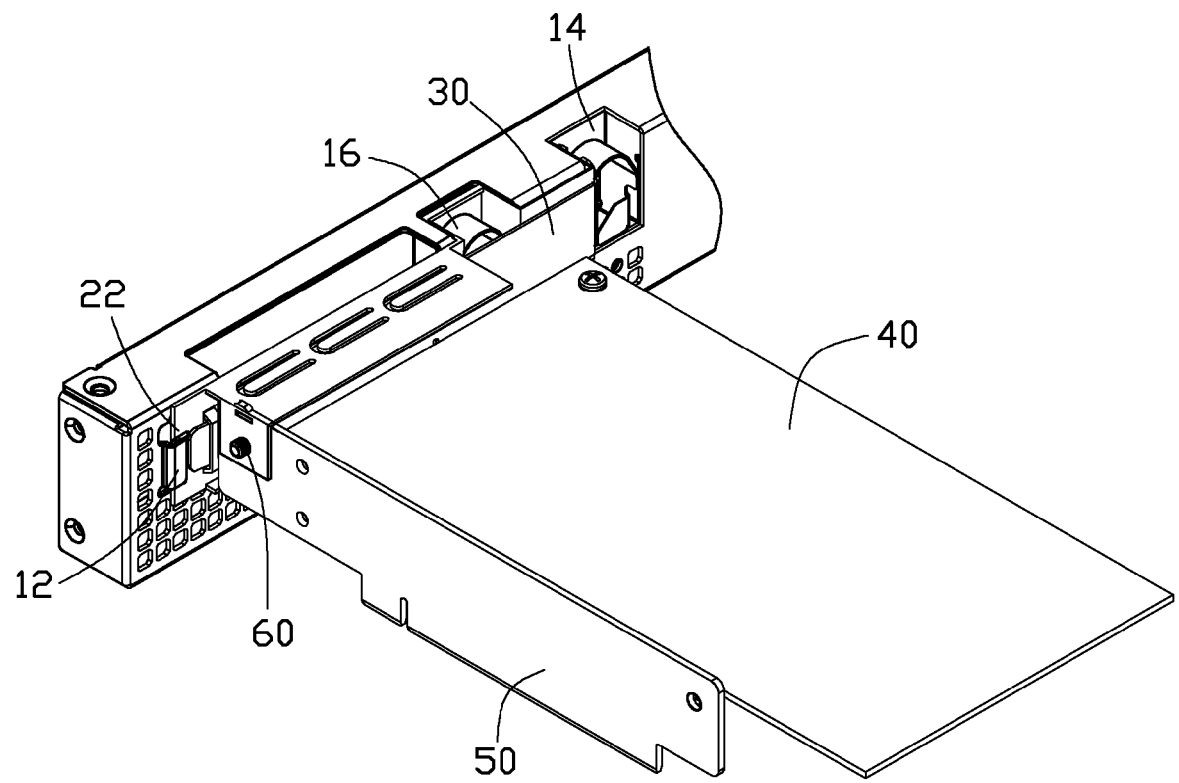
FIG. 4 is similar to FIG. 3, but viewed from another perspective.

Referring to FIGS. 3 and 4, in assembly, a screw 60 is extended through the through hole 52 and is engaged in the through hole 242, to mount the switch member 50 to an inner surface of the fixing tab 240 facing the connection portion 223. The expansion slot 54 faces the connection portion 223.

In mounting the first expansion card 40, a second end of the fixing member 30 opposite to the fixing piece 32 is inserted into the engaging hole 224, until the edge connector 42 engages in the expansion slot 54. The fixing piece 32 abuts against an outer surface of the second tab 225 opposite to the connection portion 223. The protrusion 226 of the second tab 225 is engaged in the cutout 34.

The frame 20 together with the first expansion card 40 is attached to the rack 10. The first end of the first plate 22 is inserted between the blocking portion 12 and the rack 10, until the edge connector 55 is electrically connected to a motherboard. The first and second tabs 222 and 225 are respective received in the recessed portions 14 and abut against the corresponding sidewalls 142. The third tab 2230 abuts against the sidewall 140 of the recessed portion 14 receiving the first tab 222. The extension tabs 2232 respectively abut against the back wall of the recessed portion 14 receiving the first tab 222 and a front side surface of the rack 10 between the recessed portions 14. Therefore, the fixing piece 32 is pushed by the corresponding resilient portion 16 to abut against the second tab 225, to mount the first expansion card 40 to the rack 10.

Referring to FIG. 5, the mounting steps for mounting the second expansion card 80 to the rack 10 are same to the first expansion card 40, but the fixing piece 32 of the fixing member 70 fixed to the second expansion card 80 is abutted against the first tab 222 by the corresponding resilient portion 16.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A mounting device for selectively mounting expansion cards with different lengths, each expansion card having a fixing member, the fixing member forming a fixing piece, the mounting device comprising:
   a rack defining a plurality of spaced recessed portions each comprising two opposite sidewalls and a bottom wall connected between bottoms of the sidewalls, each bottom wall forming a resilient member; and
   a frame detachably mounted to the rack, and comprising a plurality of first tabs respectively received in the recessed portions, and a plurality of connection portions each connected between two adjacent first tabs, each first tab abutting against one of the opposite sidewalls of the corresponding recessed portion;
   wherein when an expansion card is mounted by the mounting device, the fixing piece of the expansion card is received in one of the recessed portions and pushed by the corresponding resilient member to abut against the corresponding first tab.

2. The mounting device of claim 1, wherein a protrusion protrudes from each first tab to be engaged with the fixing piece of an expansion card once the fixing piece is received in the corresponding recessed portion.

3. The mounting device of claim 1, wherein an L-shaped blocking portion is formed on the rack opposite to the recessed portions to detachably block an end of the frame opposite to the first tabs.

4. The mounting device of claim 1, wherein each resilient member comprises a substantially C-shaped resilient portion defining an opening facing the corresponding bottom wall, a distal end of the resilient portion resiliently abuts against the corresponding sidewall of the corresponding recessed portion to sandwich the corresponding first tab together.

5. The mounting device of claim 1, wherein each connection portion comprises a second tab parallel to the first tabs, and two extension tabs extending from opposite ends of the second tabs to be connected to the corresponding first tabs.

6. The mounting device of claim 1, further comprising a switch member fixed to the frame, wherein the switch member comprises a circuit board, an expansion slot formed on a side surface of the circuit board to be electrically connected to the expansion card, and an edge connector formed on a bottom side of the circuit board.

7. The mounting device of claim 1, wherein a holding piece is formed on the frame to hold the fixing member.

\* \* \* \* \*